June 15, 1926.

W. E. VERGAN

AIR BRAKE

Filed Sept. 2, 1924

Inventor:
William E. Vergan
By Gillson, Mann & Cox
Attys

Patented June 15, 1926.

1,588,825

UNITED STATES PATENT OFFICE.

WILLIAM EUGENE VERGAN, OF DENISON, TEXAS, ASSIGNOR OF ONE-HALF TO WILLIAM A. MITCHELL, OF DENISON, TEXAS.

AIR BRAKE.

Application filed September 2, 1924. Serial No. 735,234.

This invention relates to pneumatic brakes. One of the objects of the invention is the provision of new and improved means for automatically maintaining a predetermined pressure in the brake pipe line of railway trains and the like for controlling the brakes of said train.

Another object of the invention is the provision of new and improved means for automatically compensating for the loss of pressure in the brake pipe line of railway trains and the like due to the leakage in said line during the application of the brakes.

A still further object of the invention is the provision of new and improved means for automatically maintaining the same pressure in a pipe line as is maintained in the equalizing reservoir of railway trains and the like.

Other objects of the invention are the provision of a differential pressure operated brake valve for compensating for the leakage of air in the train brake pipe line while the engineer's valve is on lap, that is simple in construction, cheap to manufacture, readily assembled, easily installed, that is automatic in its operation and that is not likely to become broken or get out of order.

Other and further objects and advantages of the invention will appear from the following description taken in connection with the accompanying drawings, in which—

It is common practice to provide railway trains and the like with air brakes. Usually the Westinghouse type of air brakes are employed. In this system, as is well known, the train brakes are applied by operating the engineer's brake valve to release the pressure in the equalizing reservoir, which automatically releases the pressure in the brake pipe line and through suitable mechanism applies the brakes. When the brakes are required to be only partially applied as when descending a grade or the like the engineer after applying the brakes the required amount moves the valve handle to lap which closes all ports, and if there is no leakage the pressure in the brake pipe line will remain constant, thus holding the brakes applied as indicated by the gauge.

It is well known, however, that the train brake pipe line leaks more or less, caused by loose joints, defective gaskets, deterioration of the connecting air brake hose, worn angle cocks, and the like. This leakage will cause a gradual reduction in the pressure within the brake pipe line below that in the equalizing reservoir, with a consequent gradual further application of the brakes.

Suitable means have been provided for overcoming this difficulty, and for automatically supplying air to the main brake pipe line to prevent the pressure in said line from decreasing below that in the equalizing reservoir. In the form of the device selected to illustrate one embodiment of the invention a pressure operated valve is employed to control the supply of air from the main reservoir to the train brake pipe line.

Figure 1:
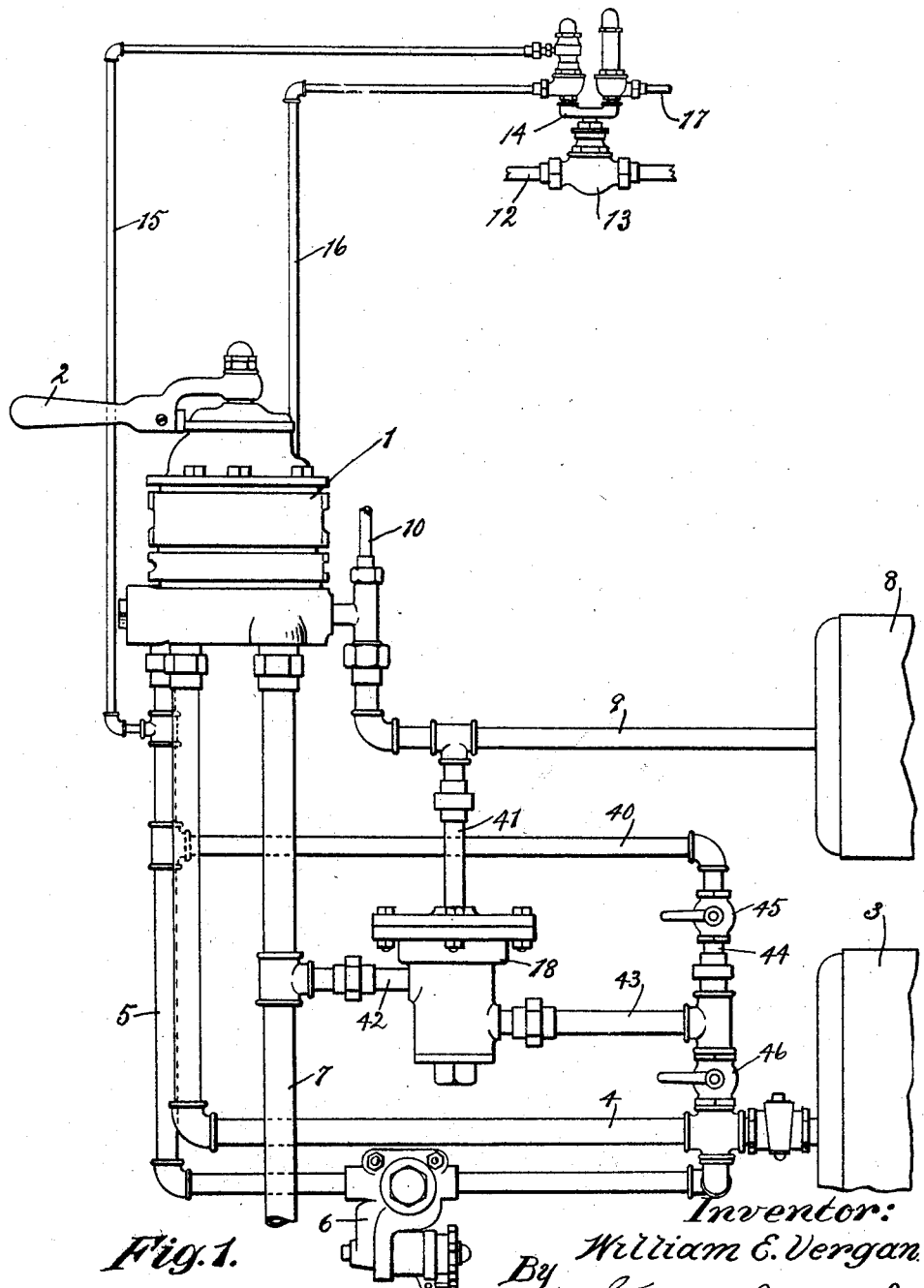
Fig. 1 is a diagrammatic view of a brake system for railway trains showing the invention in position therein, with parts broken away and parts omitted for the sake of clearness.
Figures 2, 3:
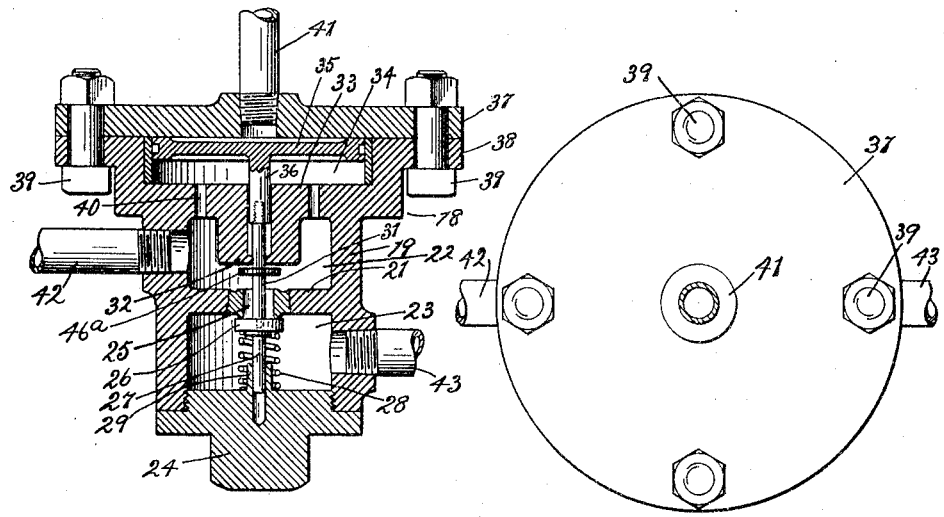
Fig. 2 is a vertical section on line 2—2 of Fig. 3.
Fig. 3 is a plan view of the device shown in Fig. 1.

In Figs. 1 to 3, inclusive, is shown diagrammatically a portion of a railway train pneumatic brake system, parts being omitted for the sake of clearness, and in which the numeral 1 designates an engineer's brake valve of the usual or any well known construction, that shown being what is known as the Westinghouse H–6. The valve is operated by the handle 2 in the usual manner. The main reservoirs 3, only one of which is shown, are connected to the engineer's brake valve 1 by the main reservoir pipe or conduit 4 and by the feed valve pipe 5, as is the usual practice in such constructions. The usual feed valve 6 which supplies compressed air from the main reservoir through the engineer's valve 1 to the brake pipe line 7 at a constant but reduced pressure over that contained in the main reservoir, may, if desired, be located in the pipe 5 between the main reservoir and said engineer's valve. The equalizing reservoir 8 is in communication with the valve 1 through the conduit or pipe 9 and with a suitable gauge through the pipe 10.

The steam pipe for supplying motive fluid to the compressor and the valve for controlling the flow of said fluid is shown at 12 and 13, respectively. The valve 13 is controlled by the governor 14 in the usual manner. The low pressure operating pipe is shown at 15 and the high pressure operating pipe at 16. The governor is in communication with the main reservoirs through the pipe or passage 17 as is common in such constructions.

The mechanism and arrangement of the parts thus far described are the same as that employed in the usual or well-known Westinghouse air brake system, and since the specific details of the valves, ports, reservoirs, conduits and their arrangement constitute no part of the present invention, it is not thought necessary to further illustrate and describe the same.

It is desirable that means be provided for delivering air under pressure from the main reservoir 3 into the train brake pipe 7 when the pressure within said pipe falls below that in the equalizing reservoir 8. Any suitable automatically operated means may be employed for performing this function. As shown, a pressure controlled valve device or compensating valve 18 is used for this purpose. This device comprises the casing 19 which is provided with a partition 21 which divides the casing into two chambers 22 and 23. The lower chamber may be closed by a removable cap 24. The partition 21 is provided with a port or opening 25 which affords a communication between said chambers. The port or opening 25 is adapted to be normally closed by a valve 26 which is provided with a guide stem 27, adapted to engage a bore in the cap 24. A light spring 28 extending about the guide stem 27 and the boss 29 on the cap 24 is adapted to press the valve 26 against its seat. The valve 26 is also provided with an upwardly extending stem 31 which is adapted to extend upwardly through a guide 32 supported in any suitable manner in the upper chamber 22. As shown, the guide is formed by a partition 33 extending across the casing above the chamber 22. The upper end of the casing is provided with a recess 34, in which is slidably mounted a piston 35. The piston 35 has a stem 36 which is adapted to engage a bore in the partition 33 in alignment with the stem 31 of the valve 26 to which it is detachably connected. Excess pressure on the upper or lower side of the piston 35 is adapted to open or close the valve 26 as will presently appear. The recess 34 is provided with a cover 37 which is detachably connected to the flange 38 on the upper end of the casing, as by means of the bolts 39. Suitable openings 40 are provided in the partition 33 to afford free communication between the chamber 22 and the recess 34.

The recess 34, above the piston 35, is in communication with the equalizing reservoir through the pipe 41 which may be connected to the pipe 9 between said reservoir and the engineer's valve. A pipe 42 connects the chamber 22 with the brake pipe 7. The chamber 22 is in communication with the main reservoir pipe 4 as through the pipes 43 and 44. It is also in communication with the feed valve pipe 5 through the pipes 43, 44 and 40. The pipe 44 is provided with valves 45 and 46 at each side of the pipe 43 whereby the chamber 22 may be selectively supplied with air under pressure from either the main reservoir direct or from the feed valve as circumstances may require. When the valve 45 is closed and the valve 46 is open air may be supplied to the chamber 22 below the valve 26 directly from the main reservoir 3. When the valve 46 is closed and the valve 45 is open the chamber 22 is supplied with air from the feed valve pipe 5 as clearly shown in Fig. 1 of the drawing.

Under normal conditions, when the valve 45 is closed and the valve 46 is open the pressure in the equalizing reservoir operating on what for convenience will be termed the upper side of the piston 35 will tend to open the valve 26 while the pressure in the pipe line 7 will operate on what for convenience will be termed the lower side of said piston and tend to close the valve 26. If the pressure on the two sides of the piston be substantially equal the light spring 28 will maintain the valve in closed position.

In the operation of the device, if it is desired to apply the brakes to a greater or less extent, the engineer moves the valve handle to "service position" until the desired reduction in pressure in the equalizing reservoir, and the consequent application of the brakes, has been reached, when the handle is moved back to lap. If leakage now occurs in the train brake pipe line the pressure within the pipe 7 and chamber 22 will decrease thus permitting the pressure in the chamber 34 from the equalizing reservoir to open the valve 26 and permit compressed air to enter the train line 7 until the pressure therein equalizes that within the equalizing reservoir. The pressure now being the same on both sides of the piston 35 the spring 28 will close the valve 26. The brakes will thus be held applied to the desired extent corresponding to the pressure within the equalizing reservoir.

Under certain conditions or in certain type of engineers' valves or brake equipment, it may be desirable to connect the chamber 22 with the feed pipe for automatically supplying air to the brake pipe line for compensating for leakage in said line. For instance, in certain brake systems this latter arrangement may be more convenient to install. Under other conditions, as where uniform sensitiveness of the compensating valve is advantageous or desirable, connecting the chamber 22 with the feed pipe will give the desired results. The pressure within the main reservoir varies considerably while that within the feed pipe line remains fairly constant, and since the pressure on the upper side of the piston 34 must overcome the tension of the spring and the pressure in the chamber 22 on the under side of the valve, it follows that a more accurate and sensitive arrangement will result by connecting the chamber 22 with the feed pipe. In the construction shown this is accomplished by closing the valve 46 and opening the valve 45. While I have shown means for selectively connecting the chamber 22 with either the main reservoir or the feed pipe, it is understood that either or both connections may be employed as desired.

The stem 31 may be provided with a valve 46ª which is adapted to close the port 25 and prevent the escape of air through the pipe 42 from the main reservoir should the pipe line 7 become broken or the parts disconnected. The valve 46ª is of sufficient distance above the port 25 that it will not interfere with the normal operation of the device.

The valve stem 31 may be made in sections, detachably connected together, whereby the valves, piston and connecting stems may be assembled in the casing 19.

If the operation of the valve 18 is not desired, the valves 45 and 46 may both be closed.

Figure 4:
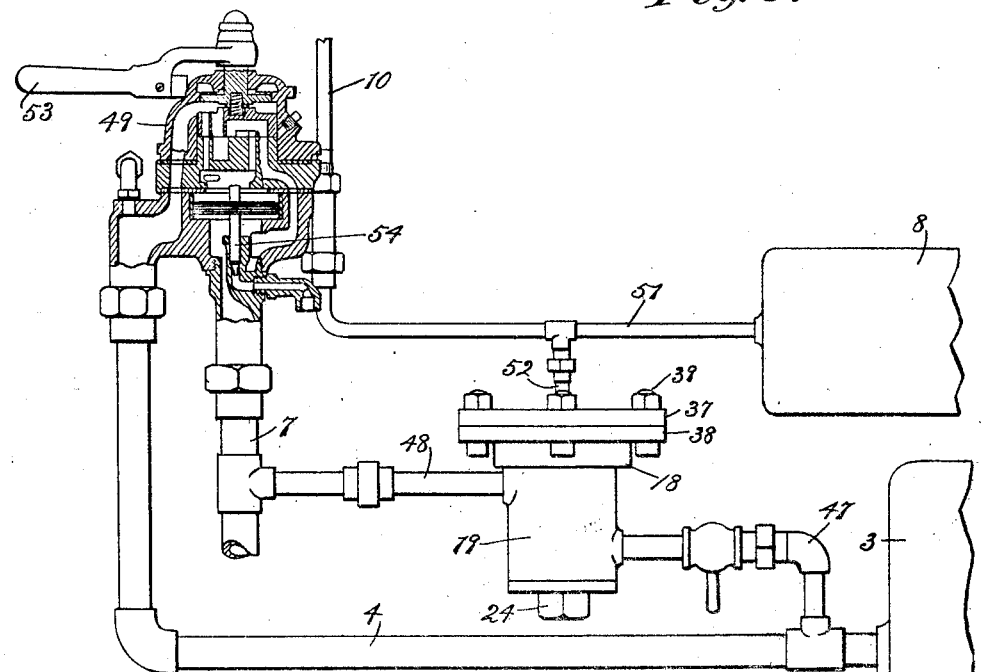
Fig. 4 is a diagrammatic view of a portion of a brake system for railway trains showing a modified form of the application of the device, with parts in section, parts broken away, and parts omitted.

In the form of the device illustrated in Fig. 4, the compensating valve 18 is the same as that shown in Fig. 2. The chamber 22 is connected to the main reservoir 3 through the pipe 47 and the chamber 22 is connected to the brake pipe line 7 by the pipe 48. The equalizing reservoir is connected to the engineer's brake valve 49 and the recess 34 by the pipes 51 and 52.

The engineer's brake valve is the type known as Westinghouse G–6 and the handle 53 is shown in "release" position. In the position shown, air under pressure is entering the pipe line 7 and also the equalizing reservoir and consequently the valve 54 remains seated and the pressure remaining the same on both sides of the piston 35 the valve 26 will also remain seated. The operation of the valve 18 is substantially the same as that shown in Fig. 1 when the valve 46 is open and the valve 45 closed.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:—

1. A braking system for railway trains comprising a main reservoir containing compressed air, an equalizing reservoir, a train brake pipe line, means for automatically supplying air to said pipe line when the pressure in the same falls below that in said equalizing reservoir, said means comprising a casing having a pair of chambers therein, a port for connecting said chambers, a cylinder in one end of said casing in communication with one of said chambers, an equalizing piston in said cylinder, a cap for said cylinder, a valve stem carried by said piston, a single valve on said stem for closing said port, a conduit for connecting the equalizing reservoir with one end of said cylinder, a conduit for connecting said brake pipe to one of said chambers and the other end of said cylinder on the opposite side of said valve, and a conduit for connecting the other chamber with the main reservoir.

2. A pneumatic braking system comprising a main reservoir, an equalizing reservoir, an engineer's valve in communication with said reservoirs, a brake pipe in communication with said valve, means for automatically preventing the pressure within said pipe from falling below that within said equalizing reservoir, and means for preventing the escape of the compressed air in said main reservoir upon the accidental rupture of the brake pipe.

3. In combination, a pnumatic brake pipe line, a reservoir for supplying a fluid under pressure to said line, means for automatically maintaining a predetermined pressure in said line, under normal conditions, and means for preventing the escape of the compressed air within said reservoir when the compressed air in said line is accidentally discharged.

4. In combination, an engineer's valve, an equalizing reservoir in communication therewith, a main reservoir, a brake pipe line, an engineer's valve, and means for supplying air from said main reservoir to said brake pipe line through said valve at a predetermined pressure, and means for selectively supplying air at main reservoir pressure or at said predetermined pressure, for automatically maintaining the pressure in said line substantially the same as that in said equalizing reservoir.

5. In combination, an air brake system comprising a reservoir for containing compressed air, a brake pipe line, means for supplying air under compression to said line from said reservoir, and means including a compensating valve for automatically supplying compressed air to said line for compensating for loss of air from said line due to leakage therein, and means operated by said valve for preventing the escape of compressed air from said reservoir upon the severing of said line.

6. A device for automatically maintaining pneumatic pressure in a brake pipe line substantially equal to that in the equalizing reservoir of a pneumatic brake system, which comprises a casing having an upper and a lower chamber, a port between said chambers, a cylinder in communication with said upper chamber, an equalizing piston in said cylinder, a valve opening downwardly carried by said piston for closing said port, a conduit adapted to connect said cylinder above said piston to the equalizing reservoir, a conduit adapted to connect said upper chamber and said cylinder below said piston to the train pipe line, and a conduit adapted to connect said lower chamber to the main reservoir whereby the pressure in said main reservoir will assist in closing said valve.

WILLIAM EUGENE VERGAN.